United States Patent [19]

Nishimura

[11] Patent Number: 4,959,595

[45] Date of Patent: Sep. 25, 1990

[54] ROTATING ELECTRIC MACHINE HAVING A COIL COAXIAL WITH ROTATING SHAFT

[75] Inventor: Shinji Nishimura, Himeji, Japan

[73] Assignee: Mitsubishi Denki Kabushiki Kaisha, Tokyo, Japan

[21] Appl. No.: 298,434

[22] Filed: Jan. 18, 1989

[30] Foreign Application Priority Data

Feb. 12, 1988 [JP] Japan ................ 63-17725[U]

[51] Int. Cl.$^5$ ................ H02K 23/52; F02N 11/04
[52] U.S. Cl. ................ 318/138; 310/102 R; 322/90; 290/46
[58] Field of Search ............ 318/138, 139, 254, 244, 318/245, 246, 248, 251; 310/102 R, , 112, 113, 261; 322/10, 90; 290/22, 31, 46; 123/179 R, 179 A; 388/805

[56] References Cited

U.S. PATENT DOCUMENTS

| | | | |
|---|---|---|---|
| 461,296 | 10/1891 | Van Depoele | 310/261 X |
| 2,331,960 | 10/1943 | Button | 388/805 |
| 2,442,213 | 5/1948 | Ross | 388/805 |
| 2,483,146 | 9/1949 | Merrill | 318/244 X |
| 2,489,982 | 11/1949 | Schwarz | 318/244 |
| 2,790,125 | 4/1957 | Ryde | 318/251 |
| 2,907,941 | 10/1959 | Johnson et al. | 318/251 X |
| 3,034,035 | 5/1962 | Baumann et al. | 310/113 X |
| 3,562,618 | 2/1971 | Tsergas | 318/246 |
| 4,093,869 | 6/1978 | Hoffmann et al. | 290/31 |
| 4,743,777 | 5/1988 | Shilling et al. | 290/31 X |
| 4,797,602 | 1/1989 | West | 290/46 X |

FOREIGN PATENT DOCUMENTS 54949 11/1986 Japan .

*Primary Examiner*—Bentsu Ro
*Attorney, Agent, or Firm*—Sughrue, Mion, Zinn, Macpeak & Seas

[57] ABSTRACT

A starter-generator of an automobile is disclosed which comprises a stationary field coil wound and disposed coaxially around the rotational axis. The rotor comprises a pair of field pole forming members on which circumferentially alternating field poles are excited by the magnetic flux generated by the field coil. Armature coils connected in Y-connection are disposed around the rotor, and the terminals of the armature coils are coupled to the inputs of a three-phase rectifier circuit (used when the starter-generator acts as a starting motor) and the outputs of a armature current switching circuit (used when the starter-generator acts as a charging generator) which controls the flow of current through the armature coils so that a rotating magnetic field is formed. The starter-generator further comprises a pair of auxiliary coils which are wound and disposed around the rotational axis at both sides of the armature in the neighborhood of the rotor. A current is supplied to these auxiliary coils in a direction opposite to that of the current supplied to the field coil. The current supplied to the auxiliary coils are regulated in response to the magnetic flux density detected by Hall elements positioned near the rotational axis, to minimize the flux in the neighborhood of the rotational axis.

8 Claims, 3 Drawing Sheets

ROTATING ELECTRIC MACHINE HAVING A COIL COAXIAL WITH ROTATING SHAFT

BACKGROUND OF THE INVENTION

1. Field of the Invention

This invention relates to a rotating electric machine having a stationary field coil wound and disposed coaxially around the rotational axis thereof; in particular, it relates to such a rotating electric machine utilized as a starter-generator of an automotive vehicle.

2. Description of the Prior Art

In general, a DC motor and a separate synchronous AC generator are used as the engine starter and the charging generator, respectively, of an automobile. However, for the purpose of achieving maximum compactness and economy, a single rotating electric machine is sometimes utilized both as the engine starter and the charging generator of an automobile. Japanese Patent Publication No. 61-54949, for example, disclose a type of such rotating electric machine. Although synchronous rotating electric machines usually comprise a field winding mounted on the rotor and an armature winding disposed on the stator, the starter-generator disclosed in the above-mentioned Japanese patent comprises a stationary field winding wound and disposed coaxially around the rotational axis of the machine, as described below.

FIG. 1 shows an upper half portion of an axial section of a starter-generator of the type disclosed in the above-cited Japanese patent. The starter-generator, directly attached to the internal combustion engine situated on the left side in the figure, comprises a rotor 1, a field winding 2, and an armature 3. The rotor 1 comprises a pair of field pole forming members 1a and 1b both made of a ferromagnetic material. The substantially disk-shaped pole forming member 1a, which also acts as a fly wheel of the engine, is fixedly secured to the end of the crank shaft 4 of the engine by means of bolts 5, and peripherally comprises a comb-shaped structure having circumferentially spaced teeth or projections extending in the axial direction toward the member 1b on the left side in the figure. On the other hand, the pole forming member 1b consists of a comb-shaped structure having circumferentially spaced teeth or projections extending in the axial direction toward the member 1a. These projections of the field pole forming memebers 1a and 1b extending in opposite axial directions alternate each other in the circumferential direction to form circumferentially spaced alternating north and south field poles along the circumference of the rotor 1. The field winding 2 for exciting field pole forming members 1a and 1b consists of a coil wound on a field core 6 around the central rotational axis C of the rotor 1. The field core 6 is secured to a rear plate 7, opposing the field pole forming members 1a and 1b with a small radial gap, respectively. The armature 3 comprises armature cores 3a which are mounted to and extending radially inwardly from the housing 8 to oppose the circumferential surface of the rotor 1 with a small radial gap; the armature 3 further comprises an armature winding consisting of coils 3b wound around the cores 3a and connected in three-phase Y-connection. Further, the field pole forming member 1a is coupled to a clutch 9 which connects and disconnects the rotational force between the crank shaft 4 and the driving shaft 10 of a reduction gear (not shown) at the right side in the figure. The diaphragm spring clutch 9 comprises clutch disk 11 secured to the driving shaft 10, pressure plate 12, a disk-shaped diaphram spring 13 for urging the plate 12, and a clutch cover 14 secured to the field pole forming member 1a by means of bolts 15. Crank angle detector 16, on the other hand, detects the rotational angle of the chrank shaft 4, or more precisely, rotational angles of the field poles of the rotor 1.

The operation of the starter-generator device of FIG. 1 is roughly as follows. When the device acts as a starting motor, field winding 2 is supplied with a DC current to excite and form alternating field poles along the circumference of the rotor 1. At the same time, armature winding 3b is supplied with an AC current to form a rotating magnetic field. Thus, magnetic flux $\Phi$ is formed through the field core 6, field pole forming member 1a, armature cores 3a, and field pole forming member 1b, and the resulting torque drives and rotates the rotor 1 of the device. On the other hand, when the device acts as an AC generator, field winding 2 is supplied with a DC current and the rotor 1 is driven and rotated by the engine; the AC voltages induced in the armature winding 3b by rotating field poles formed on the rotor 1 are rectified into a DC voltage to charge the battery, etc.

The conventional starter-generator as described above, however, has the following disadvantage. Since the field coil 2 is disposed coaxially with the rotational axis C and a DC current flows therethrough, a leakage flux $\Phi'$ shown by dotted arrows is inevitably formed, in addition to the normal flux $\Phi$. This leakage flux $\Phi'$ runs around rotor 1 and armature 3, and, near the rotational axis C, passes through the crank shaft 4 of the engine and the driving shaft 10 of the reduction gear. As a result, the crank shaft 4 and the driving shaft 10 are magnetized by the leakage flux $\Phi'$. When oil is used as the lubricant, particles of magnetic materials, which are formed by the abrasion of these shafts, gears, etc., and floating in the lubricant oil, are also magnetized and adhere not only to these shafts 4 and 10 but also to bearings and gears coupled thereto. This promotes further abrasion of these shafts, bearings, and gears, to reduce the durability and reliability of the machine.

SUMMARY OF THE INVENTION

Thus, an object of this invention is to provide a rotating electric machine having a stationary coil disposed coaxially around the rotational axis thereof, wherein the magnetization of the shafts, bearings, and gears near the rotational axis due to the leakage flux generated by the stationary coil is prevented, so that, as a consequence, adhesion of abraded particles to surfaces of the shafts, bearings, and gears, etc., in frictional contacts, etc., due to the magnetization thereof is effectively suppressed, thereby enhancing the durability and reliability of the machine.

A further object of this invention is to provide such a rotating electric machine which is suited to be used as a starter-generator of an automotive vehicle.

A still further object of this invention is to provide such a rotating electric machine which is simple in structure and low in production costs.

According to this invention, a rotating electric machine is provided which comprises: a stationary field coil wound and disposed coaxially around the central rotational axis of the machine; a rotor having a peripheral field pole forming structure on which circumferentially alternating field poles are excited by the magnetic flux formed by the field coil; an armature including armature coils disposed around the rotor; and at least one auxiliary coil wound and disposed coaxially around the central rotational axis of the machine. During operation, a current is supplied to the auxiliary coil in a direction opposite to the current flowing through the field coil, thereby reducing the magnetic flux density to a vanishingly small level in the neighborhood of the central rotational axis, where shafts, bearings, and gears in frictional contacts are situated. It is preferred that a magnetic flux detector, such as a Hall element, be disposed near the rotational axis, and the current supplied to the auxiliary coil regulated in response to the detected magnetic flux density. The rotating electric machine may function both as a motor and a generator; in that case, it comprises not only a rectifier circuit coupled to the terminals of the armature coils, but also a circuit for supplying and switching currents to the armature coils so that a rotating megnetic field is formed. This type of machine is especially suited to be used as a starter-generator of an automobile. The minimization of the leakage flux in the neighborhood of rotational axis substantially reduces the abrasion of the shafts, bearings, and gears.

BRIEF DESCRIPTION OF THE DRAWINGS

The novel features which are believed to be characteristic of this invention is set fourth with particularity in the appended claims. The organization and operation of this invention itself, however, may best be understood by reference to the following detailed description of the preferred embodiments, taken in conjunction with the accompanying drawings, in which:

In the drawings, like reference numerals represent like or corresponding parts or portions.

DETAILED DESCRIPTION OF THE PREFERRED EMBODIMENTS

Figure 2:
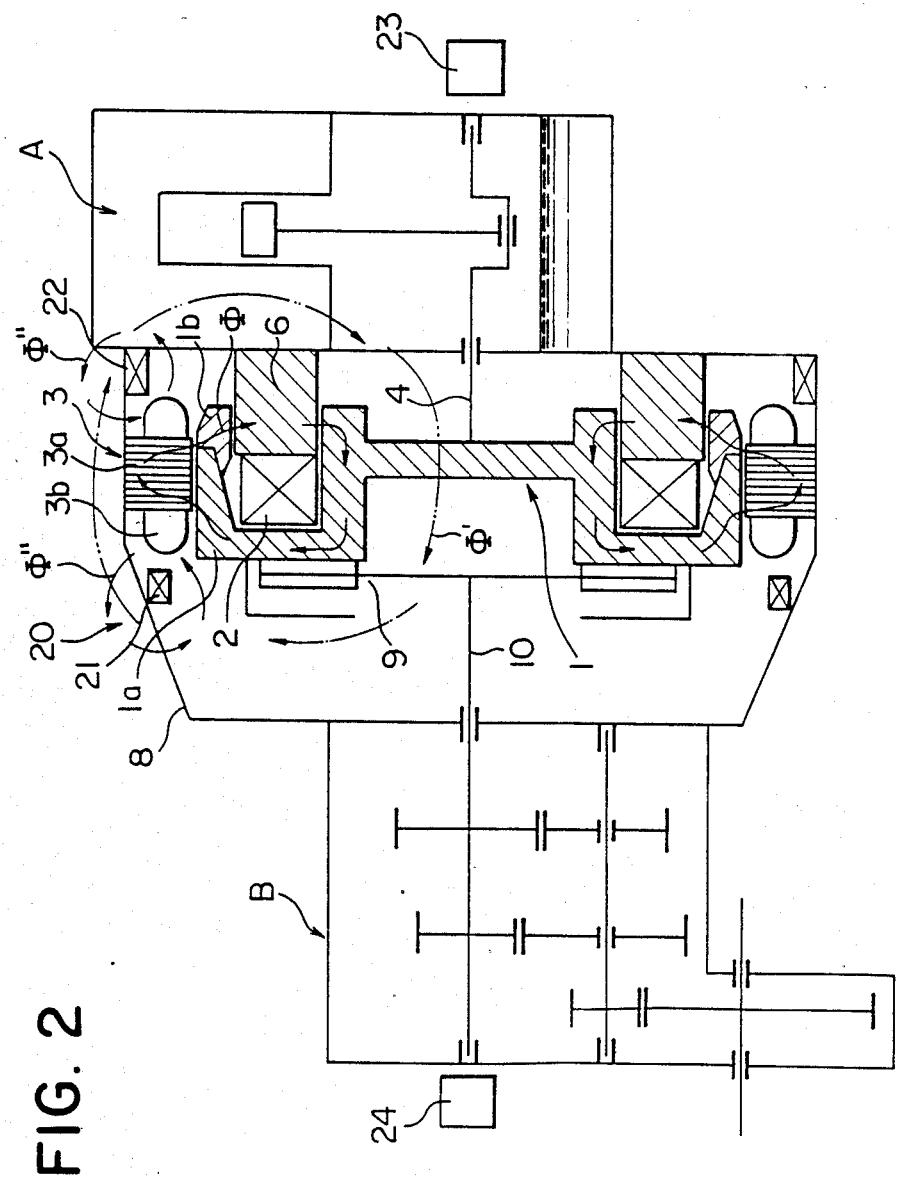
FIG. 2 is an axial sectional view of a starter-generator of an automobile according to this invention, showing schematically the associated engine and transmission gear train therewith.
Figure 3:
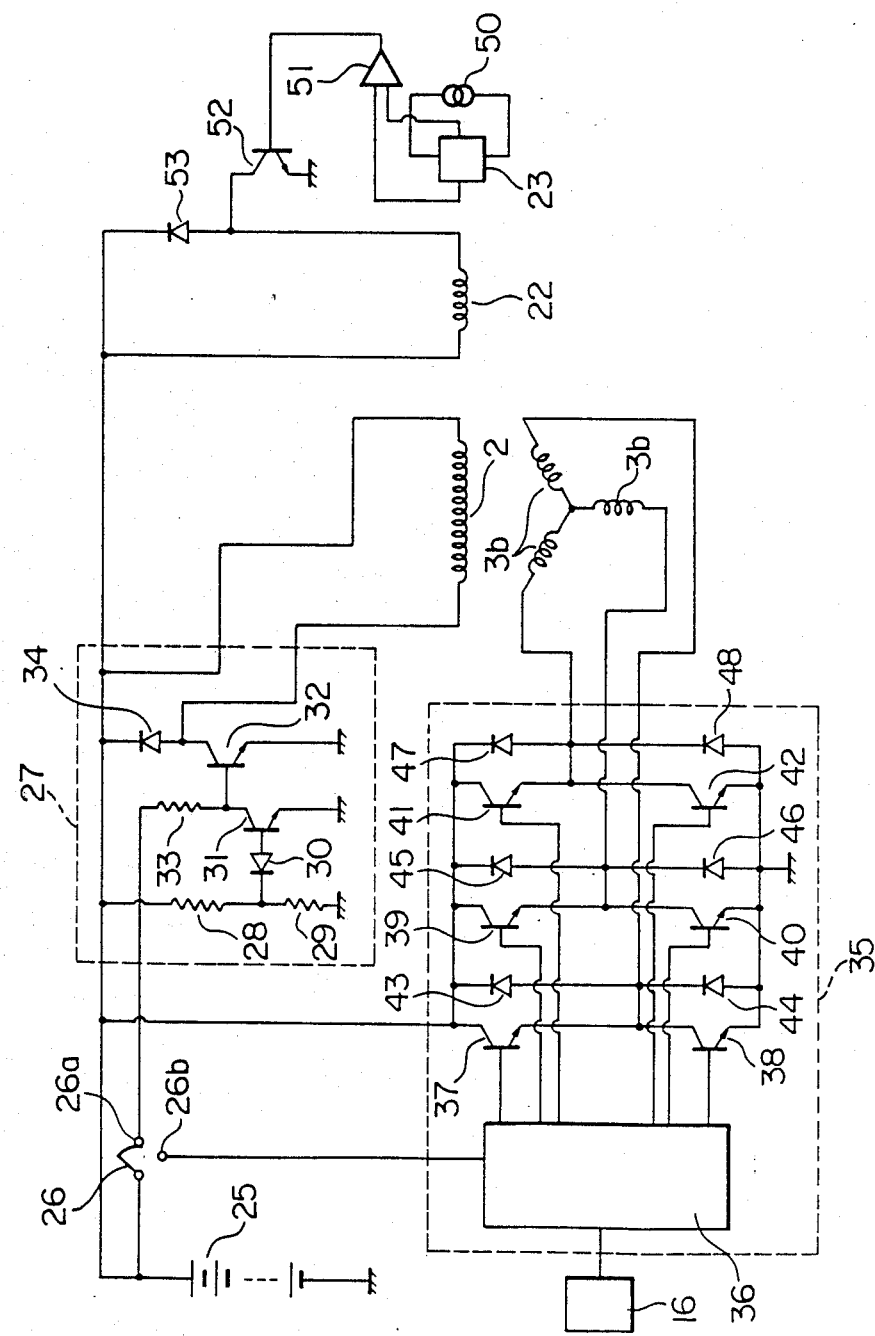
FIG. 3 is a circuit diagram of the starter-generator of FIG. 2, showing an overall structure of the circuit.

Referring now to FIGS. 2 and 3 of the drawings, an embodiment according to this invention is described.

Figure 1:
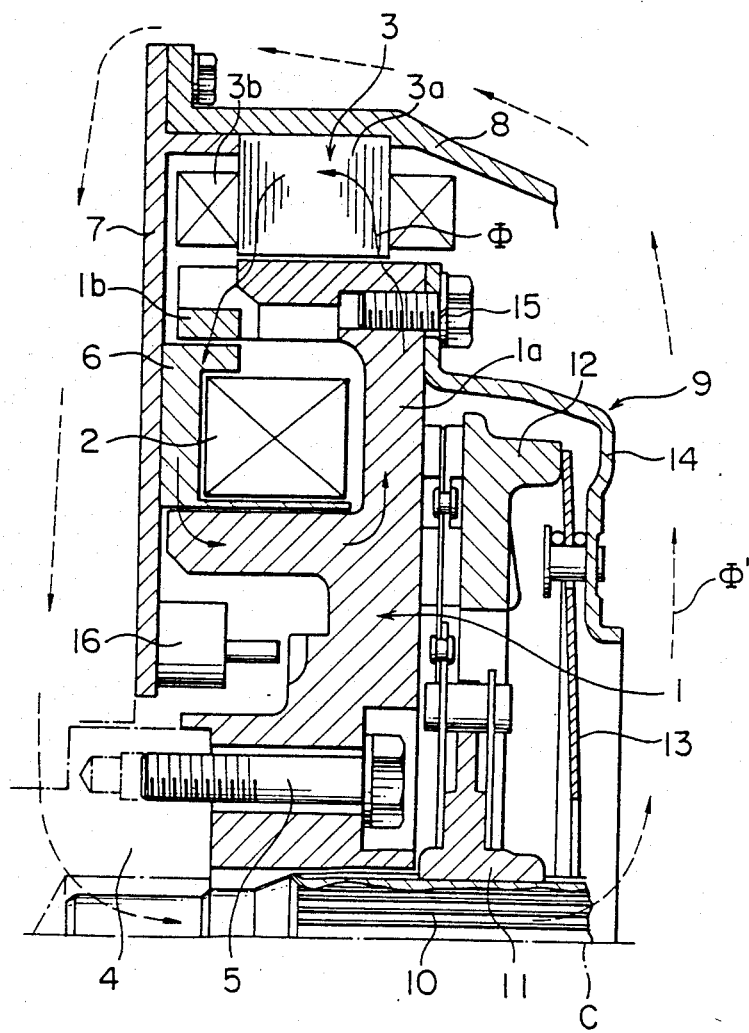
FIG. 1 is a partial axial sectional view of a conventional starter-generator of an automobile having a stationary field winding wound and disposed coaxially around the central rotational axis of the machine, the figure showing an upper half section.

FIG. 2 shows an axial cross section of a starter-generator device 20 for an automobile according to this invention, which is directly attached to the internal comustion engine A of the automobile shown at the right side of the starter-generator in this figure. The transmission B shown at the left side includes a reduction gear train and the driving shaft 10 thereof is coupled to the rotor 1 of the starter-generator 20 through a clutch 9. The starter-generator 20 has a structure similar to that of the device shown in FIG. 1, like reference numerals representing like or corresponding parts or portions. Since the above description of the structure of the device of FIG. 1 applies to the starter-generator 20 (except for the differences explained below), the repetition thereof is omitted here.

According to this invention, however, a pair of auxiliary coils 21 and 22 are disposed coaxially around the central rotational axis of the rotor 1 at both sides of the armature 3. The windings of coils 21 and 22 run coaxially around the rotational axis of the rotor 1, as the windings of the field coil 2. The coils 21 and 22 having diameters greater than the outer diameter of the rotor 1 are disposed at such positions at which the coils 21 and 22 thread the leakage flux $\Phi'$ which is formed by the field coil 2. More precisely, the diameters and the axial positions of the coils 21 and 22 are selected by the requirement that the magnetic fluxes $\Phi''$ formed by these coils 21 and 22 (as explained below) have minimum adverse effects on the field poles formed on the rotor 1, and, at the same time, are effective in counteracting the leakage flux $\Phi'$ formed by the field coil 2 near the rotational axis. In operation, DC current flow through these auxiliary coils 21 and 22 in a direction opposite to that of the DC current flowing through the field coil 2 to form magnetic fluxes $\Phi''$ having a direction opposite to that of leakage flux $\Phi'$ as explained in greater detail below. Further, magnetic flux detectors 23 and 24 consisting, for example, of Hall elements which measure the magnetic flux density by means of the Hall effect, are disposed at the ends of crank shaft 4 of the engine A and the driving shaft 10 of the transmission B, respectively. The current through the auxiliary coils 21 and 22 are controlled to form a magnetic flux $\Phi''$ which counterbalances the flux $\Phi'$ and will make the magnetic flux density at the shafts 4 and 10 substantially vanish, as explained in more detail below.

FIG. 3 shows an overall circuit structure of the starter-generator of FIG. 2 (with a simplification explained below). The negative terminal of battery 25 is grounded, while the positive terminal thereof is coupled to a key switch 26 connecting and disconnecting the ignition side and the starting side contact point 26a and 26b to the positive terminal of the battery 25. The voltage regulator 27 includes a voltage divider consisting of serially connected resistors 28 and 29 coupled across the battery 25. An intermediate point between the resistors 28 and 29 is coupled to the base of transistor 31 through a Zener diode 30. The collector of the transistor 31 is coupled to the base of the power transistor 32, which base is coupled to the ignition side contact point 26a of the key switch 26 through a base resistor 33. The emitter of the transistor 31 is grounded. Thus, when the voltage at the point between the resistors 28 and 29 exceeds a predetermined level to cause Zener breakdown, a current flows through the Zener diode 30 in the reverse direction. Then, the transistor 31 is turned on, to turn off power transistor 32. This power transistor 32 a collector coupled to a terminal of field winding 2 and an emitter coupled to ground. On the other hand, the field winding 2 is coupled across the positive terminal of battery 25 and the collector of power transistor 32. Thus, when transistor 31 is in the non-conducting state and power transistor 32 in the conducting state, a field current flows from the positive terminal of the battery 25 through the field winding 2 and the power transistor 32. Further, a flywheel diode 34 is coupled across the field winding 2 to absorb the surge which is generated when the power transistor 32 is turned on and off.

The armature current switching circuit 35 includes a control circuit 36 having an input coupled to the starting side contact point 26b of the key switch 26 and another input coupled to the crank angle detector 16. The detector 16 comprises, for example, three detector units each detecting the rotational angle of the field poles on the rotor corresponding to one phase of the armature coils 3b coupled in three-phase Y-connection.

When the battery voltage is applied through the key switch 26 to the control circuit 35, it outputs on-off signals (i.e., high and low or ground level voltages) to the bases of the transistors 37 through 42 in accordance with the signals from the crank angle detector 16. The pairs of series-connected transistors 37 and 38, 39 and 40, and 41 and 42 are coupled across the terminals of the battery 25, and the intermediate points between these pairs of transistors 37 and 38, 39 and 40, and 41 and 42 are coupled to the three terminals of the armature coils 3b in Y-connection, respectively. More precisely, the collectors of the transistors 37, 39, and 41 are coupled to the positive terminal of the battery 25, while emitters thereof are coupled to the collectors of the transistors 38, 40, and 42, respectively; the emitters of transistors 38, 40, and 42 are grounded. Thus, by turning on and off the transistors 37 through 42, the control circuit 36 controls the current flowing through the armature winding 3b when the starter-generator acts as a starting motor. On the other hand, a full-wave rectifier circuit consisting of semiconductor diodes 43 through 48 and having inputs coupled to the terminals of the armature winding 3b rectifies the three-phase voltage outputted from the armature winding 3b when the starter-generator is acting as a charging generator; the series-connected diode pairs 43 and 44, 45 and 46, and 47 and 48, are coupled across the positive and negative terminals of the battery 25, the forward direction thereof being directed toward the positive terminal of the battery 25; the intermediate points between these pairs of diodes are coupled to the terminals of the armature coils 3b in Y-connection.

The circuit which controls the current through the auxiliary coil 22 according to this invention is constructed as follows. (For simplicity, FIG. 3 shows only a single auxiliary coil 22 and a single magnetic flux detector 23, and the following description is made with respect thereto. The auxiliary coil 21 is controlled by a similar circuit in response to the ouput of the detector 24.) The magnetic flux detector 23 consists of a Hall element having current input terminals coupled across output terminals of a constant current source 50. The output voltage terminals of the element 23 outputting the Hall voltage are coupled to the inputs of a differential amplifier 51, the output of which is proportional to the difference between the two inputs, i.e. the Hall voltage across the element 23. The output terminal of amplifier 51 is coupled to the base of a transistor 52. A terminal of the auxiliary coil 22 is coupled to the positive terminal of battery 25, while the other terminal thereof is coupled to the collector of transistor 52, the emitter of which is grounded. Thus, when the output of the differential amplifier 51 is sufficiently great to turn on the transistor 52, current flows from the positive terminal of the battery 25, through the coil 22, and through the transistor 52. A fly wheel diode 53 is coupled across the terminals of the coil 22 for the purpose of absorbing the surge which occurs when the transistor 52 is turned on and off.

The operation of the starter-generator shown in FIGS. 2 and 3 when functioning as a starting motor is as follows. First, the key switch 26 is put at the starting position to connect the positive terminal of the battery 25 to both contact points 26a and 26b. At this time, the engine A is at rest. Thus, the transistor 32 of the voltage regulator 27 is turned on and a field current flows through the field winding 2 and the transistor 32, thereby exciting and forming field poles on the circumference of the field pole forming members 1a and 1b of the rotor 1. At the same time, the control circuit 36 of the armature current switching circuit 35 begins to output on-off signals (i.e. high and low voltages) to the bases of the transistors 37 through 42 in accordance with the output signals from the crank angle detector 16. Thus, transistors 37, 40, and 42, for example, are turned on, and transistors 38, 39, and 41 are turned off, so that the armature current flowing in the armature coils 3b produces a magnetic field which generates a torque on the field poles on the rotor 1. After the rotor 1 begins to rotate, the control circuit 36 turns on and off the transistors 37 through 42 successively in response to the signals from the crank angle detector 16, to produce a rotating magnetic field which rotates in synchrony with the the rotor 1 with a phase difference of $\pi/2$. Namely, in accordance with the rotational angles of the field poles on the rotor 1 detected by the crank angle detector 16, the control circuit 36 controls the direction of the current through the armature coils 3b, by turning on and off the transistors 37 through 42, to produce a rotating magnetic field which is always displaced by a phase difference of $\pi/2$ with respect to the magnetic field of the field poles formed on members 1a and 1b of the rotor 1. For example, during a certain period of time, transistors 37, 40, and 42 are turned on, while transistors 38, 39, and 41 are turned off; at another period of time, transistors 38, 40, and 41 are turned on, while transistors 37, 39, and 42 are turned off. After the engine A is started, the rotor 1 is also driven by the engine. Thus, voltages are induced in the armature coils 3b by the rotating field poles on the rotor 1 due to electromagnetic induction in directions opposite to those of the voltages applied thereto from the battery 25. Hence, no unnecessary starting current flows through the armature coils 3b.

During the above-described operation, the flow of current through the auxiliary coil 22 is controlled as follows. The Hall element 23, which is supplied with a constant current from the current source 50, outputs a voltage (Hall voltage) corresponding to the magnetic flux density at the crank shaft 4 of the engine A. The transistor 52 is driven by the amplified voltage outputted from the differential amplifier 51. Thus, the current through the auxiliary coil 22 is controlled to produce a magnetic flux $\Phi''$ which counteracts the leakage magnetic flux $\Phi'$ produced by the current through the field coil 2. The principle of this operation may be explained as follows: If the magnetic flux density through the Hall element 23 vanishes due to the magnetic flux $\Phi''$ counteracting the leakage flux $\Phi'$, the Hall voltage, and, consequently, the output of the differential amplifier 51 are reduced to zero. Then, the transistor 52 is turned off and the current through the auxiliary coil 22 is stopped. Thus, the leakage flux $\Phi'$ again threads the Hall element 23 to produce a Hall voltage thereacross, so that the transistor 52 is again turned on by the output of the differential amplifier 51, thereby allowing a current through the auxiliary coil 22. To sum up the above-described operation, the current through the auxiliary coil 22 is controlled by the negative feedback in such a way that the magnetic flux density through the Hall element 23 is maintained at a constant level, which, however, can be made vanishingly small by setting the amplification factor of the feedback system at a sufficiently high level.

On the other hand, the operation of the starter-generator of FIGS. 2 and 3 during the time in which it acts as a generator is as follows. After the engine A is started, the key switch 26 is put at the ignition position (as shown in FIG. 3), thereby disconnecting the contact point 26b and the control circuit 36 of the armature current switching circuit 35 from the positive terminal of the battery 25. Thus, no voltage is applied to the armature coils 3b from the battery 25. Since the contact point 26a is still connected to the positive terminal of the battery 25 through the switch 26, a current is kept on being supplied to the field winding 2 through the voltage regulator 27. Thus, three-phase voltages are induced in the armature coils 3b by the rotating field poles formed on the rotor 1, which three-phase voltages are rectified into a DC voltage by the full-wave rectifier circuit consisting of diodes 43 through 48. The rectified DC voltage is supplied to the battery 25 and electric equipment (not shown) of the automobile. As described above, the voltage regulator controls the flow of current through the field winding 2 to regulate the output DC voltage or the voltage across the battery 25. The flow of current through the auxiliary coil 22 is controlled during this generator operation just in the same manner as during the starter operation described above.

While a particular embodiment of this invention has been described above, it will be understood that many modifications may be made without departing from the spirit thereof. For example, this invention is applicable to any type of rotating electric machine (including a machine acting solely as a generator) which comprise a stationary coil disposed coaxially with the rotational axis of the machine. Further, the number of auxiliary coils may be reduced to one, instead of two. Still further, the magnetic flux detectors may comprise devices other than Hall elements. Alternatively, instead of providing magnetic flux detectors, each auxiliary coil may be coupled in series with the field coil in such a way that the current $I_2$ through the auxiliary coil is related to the current $I_1$ through the field coil by the equation:

$$I_2 = -(M/L_2) \cdot I_1, \quad (1)$$

wherein M is the mutual inductance between the auxiliary coil and the field coil, and $L_2$ is the self-inductance of the auxiliary coil. When the equation (1) is satisfied, the magnetic flux linking the auxiliary coil: $L_2 I_2 + M I_1$ vanishes. Still other modifications of this invention is possible which would be obvious to those skilled in the art. The appended claims are contemplated to cover any such modifications as fall within the true spirit and scope of this invention.

What is claimed is:

1. A rotating electric machine comprising:
   a field coil wound and disposed coaxially around a central rotational axis of said rotating electric machine;
   current supplying means for supplying an electric current to said field coil;
   a rotor disposed coaxially with said field coil and including a field pole forming means for forming circumferentially alternating field poles on a circumference of said rotor when excited by a magnetic flux formed by said field coil supplied with the electric current from said current supplying means;
   an armature including armature coils disposed around said rotor to oppose said circumference of said rotor with a radial gap; and
   electromagnetic means for electromagnetically minimizing a magnetic flux density in the neighborhood of said central rotational axis.

2. A rotating electric machine as claimed in claim 1, wherein said electromagnetic means for electromagnetically minimizing said magnetic flux density comprises:
   at least one auxiliary coil wound and disposed coaxially around said central rotational axis of said rotating electric machine;
   magnetic flux detector means for detecting a magnetic flux density in the neighborhood of the central rotational axis of said rotating electric machine, said magnetic flux detector means outputting a signal corresponding to an amount of detected magnetic flux density; and
   current regulator means, coupled to the output of said magnetic flux detector means, for regulating a current supplied to said auxiliary coil in response to the output signal from said magnetic flux detector means, to minimize said magnetic flux density in the neighborhood of the central rotational axis of said rotating electric machine.

3. A rotating electric machine as claimed in claim 2, wherein said magnetic flux detector means comprises a Hall element supplied with a constant current by a constant current source, said Hall element outputting a Hall voltage thereacross.

4. A rotating electric machine as claimed in claim 3, wherein said current regulator means comprises a transistor coupled in series with said auxiliary coil and having a base terminal coupled to an output of said Hall element through an intermediary of an amplifier.

5. A rotating electric machine as claimed in claim 2, further comprising full-wave rectifier circuit means, coupled to terminals of the armature coils, for rectifying voltages induced in said armature coils.

6. A rotating electric machine as claimed in claim 2, further comprising armature current supplying means, having outputs coupled to terminals of the armature coils, for supplying currents to the armature coils to form a magnetic field rotating in synchrony with said rotor with a predetermined phase difference, thereby producing a torque on said rotor on the circumference of which field poles are formed.

7. A rotating electric machine as claimed in claim 2, wherein said armature coils are configured in three-phase connection.

8. A rotating electric machine as claimed in claim 2, wherein said rotor comprises a pair of field pole forming ferromagnetic members having circumferentially spaced axially extending projections circumferentially alternating with each other.

* * * * *